Dec. 27, 1932.    R. C. ECCLESTON ET AL    1,892,041
AUTOMATIC ROTARY CONVERTER AND METHOD OF STARTING THE SAME
Filed July 27, 1927    3 Sheets-Sheet 1

Fig 1

INVENTORS
Robert C. Eccleston,
Ira S. Nipher,
by Byrnes, Stebbins & Parmelee
their attys.

Patented Dec. 27, 1932

1,892,041

UNITED STATES PATENT OFFICE

ROBERT C. ECCLESTON AND IRA S. NIPPES, OF RIDGWAY, PENNSYLVANIA, ASSIGNORS TO ELLIOTT COMPANY, OF PITTSBURGH, PENNSYLVANIA, A CORPORATION OF PENNSYLVANIA

AUTOMATIC ROTARY CONVERTER AND METHOD OF STARTING THE SAME

Application filed July 27, 1927. Serial No. 208,735.

Our invention relates to dynamo-electric machinery and control systems therefor, and particularly to a method and apparatus for automatically starting rotary converters.

In starting rotary converters, it has heretofore been customary to bring the rotor up to speed either by driving the machine as an induction motor, or by mechanically spinning the rotor with the brushes lifted until the desired speed, or a speed slightly in excess of the desired speed, is obtained. Thereafter the exciting fields of the machine are energized, and after the polarity of the machine is established the brushes are lowered into engagement with the commutator.

Such an operation requires that the machine shall be provided with brush-lifting devices, induces severe internal stresses in the machine when the exciting field is applied and creates a danger of a machine being applied to the line with reversed polarity.

We provide a rotary converter in which the exciting field is slightly energized as soon as the rotor is turned, so that the polarity of the machine is entirely controlled during the starting operation, thereby eliminating the necessity for brush-lifting devices and the danger of applying a machine to the line while it is in a condition of reversed polarity. The internal stresses coincident to the sudden application of an exciting field are also avoided since a slightly energized field is maintained throughout the entire starting operation.

In order to obtain the foregoing results, we provide an exciting generator and an induction motor on the same shaft as the rotor of the rotary converter. Accordingly, as the rotor is brought up to speed, at first by the induction motor and lastly by the combined action of the induction motor and the rotary converter also operating as an induction motor with sub-normal voltage applied thereto, the voltage of the exciter is utilized for controlling a relay system that automatically controls the several switches that connect the rotary converter to the supply and distribution circuits with which it is associated.

The relay system is jointly controlled by a clock, by the condition of the alternating-current supply circuit and the voltage of the exciter, so that the rotary converter may be placed at a remotely-disposed location, such as a mine substation, and it will be started at a specific time, provided it is in mechanically perfect condition and the supply circuit is properly energized.

The accompanying drawings illustrate a present preferred embodiment of our invention in which.

We provide a motor-generator set 2 having a shaft 4, mounted in a plurality of bearings 5, and connected to the rotor 6 of the rotary converter 7, the rotor 8 of an induction motor 9 and the armature 10 of a generator 12 that energizes the relay system hereinafter more fully described. The induction motor 9 and the rotary converter 7 are supplied with electrical energy from the secondary winding 14 of a three-phase transformer 15, the primary winding 16 being Y-connected. A circuit interrupter 17, having overload trip coils 18 and 19 and a back contact 20, connects the transformer 15 to a three-phase supply line 21, the individual conductors of which are marked $a$, $b$ and $c$.

Each of the bearings 5 is provided with a bearing thermostat 22 and a single thermostat 24 is disposed in the transformer 15. The number of thermostats disposed in the transformer 15 may be varied as desired. Shaft 4 is provided with an over-speed switch 25.

The rotor 6 of the rotary converter 7 carries a plurality of slip rings 26 to 31, inclusive, and cooperates with brushes 32 and 34 on the direct current end. An exciting winding 35 is controlled by a rheostat 36.

The induction motor 9, in addition to the rotor 8, comprises three windings 37, 38 and 39, connected in delta through a circuit interrupter 40 having a contact 41 and a closing coil 42. Overload relays 44 and 45 are connected in circuit with the induction motor 9.

The generator 12, in addition to the rotor 10, comprises a field winding 46, having a controlling rheostat 47 and brushes 48 and 49 across which the relay system is connected.

The secondary winding 14 of the transformer 15 comprises three windings 50, 51 and 52, having terminals 50a, 50b and 50c, 51a, 51b and 51c, and 52a, 52b and 52c. The terminals bearing the subscripts a and c are at the ends of the windings and the terminals having the subscript b are connected intermediate the several windings. Resistors 55, 56 and 57 are connected in circuit with the terminals 50b, 51b and 52b, respectively. Reactors may be substituted for the resistors when desired.

Primary circuit

The primary circuit 21, supplying energy to the transformer 15, is provided with current transformers 58, 59 and 60, connected to the conductors a, b and c, respectively. One end of each current transformer 58 to 60 is connected to a grounded conductor 61. The other end of the current transformer 58 is connected by a conductor 62 through the overload trip coil 18, conductor 64, winding 65 of an overload relay 66, a conductor 67, a winding 68 of a phase-failure relay 69, a conductor 70 and through a winding 71 of phase-failure relay 72 to the grounded conductor 61.

The other end of the current transformer 59 is connected by a conductor 74 through coil 75 of the phase-failure relay 69, conductor 76, and through the coil 77 of the phase-failure relay 78 to the grounded conductor 61.

The other end of the current transformer 60 is connected by a conductor 79 through the trip coil 19, a conductor 80, a winding 81 of overload relay 82, a conductor 84, the winding 85 of the phase-failure relay 78 and a conductor 86 through the winding 87 of the phase-failure relay 72 to the grounded conductor 61.

Each of the phase-failure relays 69, 72 and 78 is accordingly energized by two coils normally neutralizing each other, each of which is energized from different conductors of the primary circuit 21. Accordingly, phase failure of any one of the conductors a, b and/or c results in the deenergization of one of the coils on at least two of the phase-failure relays, with the result that these two relays are operated. Each of the phase-failure relays 69, 72 and 78 is provided with a back contact 88, 89 and 90, respectively. Upon the energization of any one of the phase-failure relays, a pair of corresponding contacts 88, 89 and/or 90 is open circuited by the upward movement of the relay armature caused by the unbalance of the opposing windings.

Each of the overload relays 65 and 82 is provided with a single back contact member 91 and 92, respectively, that is open when an excessive current traverses the associated windings 65 and 81, respectively.

By reason of this protective equipment, the primary circuit is protected during operation of the rotary converter against phase-failure in any one of the conductors a, b and/or c, and is protected against overload in the conductors a and c. The back contact members 88, 89, 90, 91 and 92, respectively, serve to complete relay circuits hereinafter more fully described.

Secondary power circuit

Terminal 50a is connected by a conductor 94 to a terminal 95 that is connected by a conductor 96 to a terminal 97 of the circuit interrupter 40, through a bridging member 98, a terminal 99, the winding of overload relay 44, and a conductor 100 to the winding 39 of the motor 9. The other terminal of the winding 39 is connected by a conductor 101 to the slip ring 30 and to a terminal 102 that is connected by a conductor 103 to the terminal 50c. Accordingly, the transformer winding 50 and the motor winding 39 are connected in parallel circuit. The terminal 50b is connected through the resistor 55, a conductor 104, a circuit interrupter 105, a conductor 106, a terminal 107 and a conductor 108 to the slip ring 27. Accordingly, the slip ring 27 may be connected to the intermediate connection of the secondary winding 50.

The slip ring 27 may also be connected to the terminal 50a by a circuit extending from the terminal 50a through the conductor 94, the terminal 95, and a circuit interrupter 105a, terminal 107 and conductor 108. When the circuit interrupter 105 is closed, the voltage between the slip rings 27 and 30 is that of the section of winding extending from 50b to 50c, while with the circuit interrupter 105 open and the circuit interrupter 105a closed, the voltage is the full voltage of the winding 50.

The terminal 51a of the winding 51 is connected through a conductor 109, terminal 110, a conductor 111, a terminal 112, a conductor 113, a terminal 114, a conductor 115, a contact 116 of the circuit interrupter 40, a bridging member 117, a contact member 118 and a conductor 119 to one end of the winding 38 of the motor 9. The other end of the winding 38 is connected by a conductor 120 to a terminal 121 and a conductor 122 to the terminal 51c and to the slip ring 29. Accordingly, the winding 38 may be connected directly across the transformer winding 51. The terminal 51b of the transformer winding 51 is connected through the resistor 56, a conductor 124, a circuit interrupter 126, a conductor 127, a terminal 128 and a conductor 129 to the slip ring 26.

The terminal 51a may be connected directly to the slip ring 26 through a circuit comprising the conductor 109, the terminal 110, conductor 111, terminal 112, conductor 113, circuit interrupter 126a and the conductor 129 to the slip ring 26. Accordingly, the voltage applied to the slip ring 26 is either that of the terminal 51b or the terminal 51a in accordance with whether the circuit interrupter 126 or circuit interrupter 126a is closed.

Terminal 52a of the secondary winding 52 is connected by a conductor 130 to the slip ring 31 and a terminal of the winding 37. The other terminal of the winding 37 is connected by a conductor 131, through the overload relay 45 to a terminal 132 of the circuit interrupter 40, the bridging member 134, terminal 135 and a conductor 136 to the terminal 52c. The terminal 52b is connected through the resistor 57, conductor 137, a circuit interrupter 138, a terminal 139 and a conductor 140 to the slip ring 28.

The terminal 52c is connected directly through the conductor 136, a circuit interrupter 138a, a conductor 144, terminal 139 and conductor 140 to the slip ring 28.

Accordingly, when the circuit interrupters 105, 126 and 138 are closed, the slip rings 30—27, 29—26 and 31—28, respectively, have impressed across them a voltage corresponding to the mid-points of the transformer windings. By reason of the resistors 55, 56 and 57 inserted in these circuits, a large surge of current is prevented when the circuit interrupters are initially closed to initially apply alternating current to the rotary converter 7. When the circuit interrupters 105, 126 and 138 are open and the circuit interrupters 105a, 126a and 138a are closed, the rings 30—27, 29—26 and 31—28, respectively, have the full voltage of the transformer secondary impressed thereacross.

In order to prevent the circuit interrupters 105, 126 and 138 from being closed simultaneously with the circuit interrupters 105a, 126a and 138a, an interlock circuit is provided.

The electrical interlock for the circuit interrupters 105, 126 and 138 comprises a back contact member 145 on the circuit interrupter 138a and a back contact 146 on the circuit interrupter 105. The back contact 146 is in series with the holding coils for the circuit interrupters 105a, 126a and 138a, while the back contact 145 is in series with the holding coil for the circuit interrupter 40, the contact 41 of which controls the relay circuits energizing the coils for the circuit interrupters 105, 126 and 138. Accordingly, only one group of circuit interrupters may be closed at any one time, thereby preventing danger of short circuiting the sections of the transformer windings 51 and 52 upon themselves through the circuit interrupters 105, 105a, 126, 126a, 138 and 138a.

Phase-failure protection during starting operation

While the phase-failure relays 69, 78 and 72 protect the system from phase failure during such time as an appreciable amount of current is traversing the supply conductors of the circuit 21, however, before the circuit interrupter 40 supplying current to the motor 9 is closed, it is possible to initiate the operation of the relay system, if only one phase of the primary circuit is energized. To prevent such an occurrence, a circuit is provided that extends from the terminal 50c through the conductor 103, the terminal 102, conductor 147, manually-operated snap switch 148, the contact 149 operated by the clock 150, the winding 151 of a relay 152 and the conductor 153, fuse 153a, to the conductor 94 and the terminal 50a. Relay 152 controls the main relay circuit connected across another winding of the transformer. Hence the system cannot start with but a single phase energized. Accordingly, the operation of the relay system cannot be initiated until the clock is at such position that it closes the contact 149 and the manually operated switch 148 is closed.

The initiating relay circuit

The initiating relay circuit is completed upon the closing of the clock contacts 149 and the contact 154 of the relay 152, assuming that the bearing thermostats 22, transformer thermostat 24, the overspeed switch 25, the overload relay contacts 91 and 92, the phase-failure relay contacts 88, 89, and 90 are closed, the circuit interrupter 17 is closed, that a thermal relay 155, having a contact 156, is closed, and that a back contact on relay 158 is closed.

Figure 1:
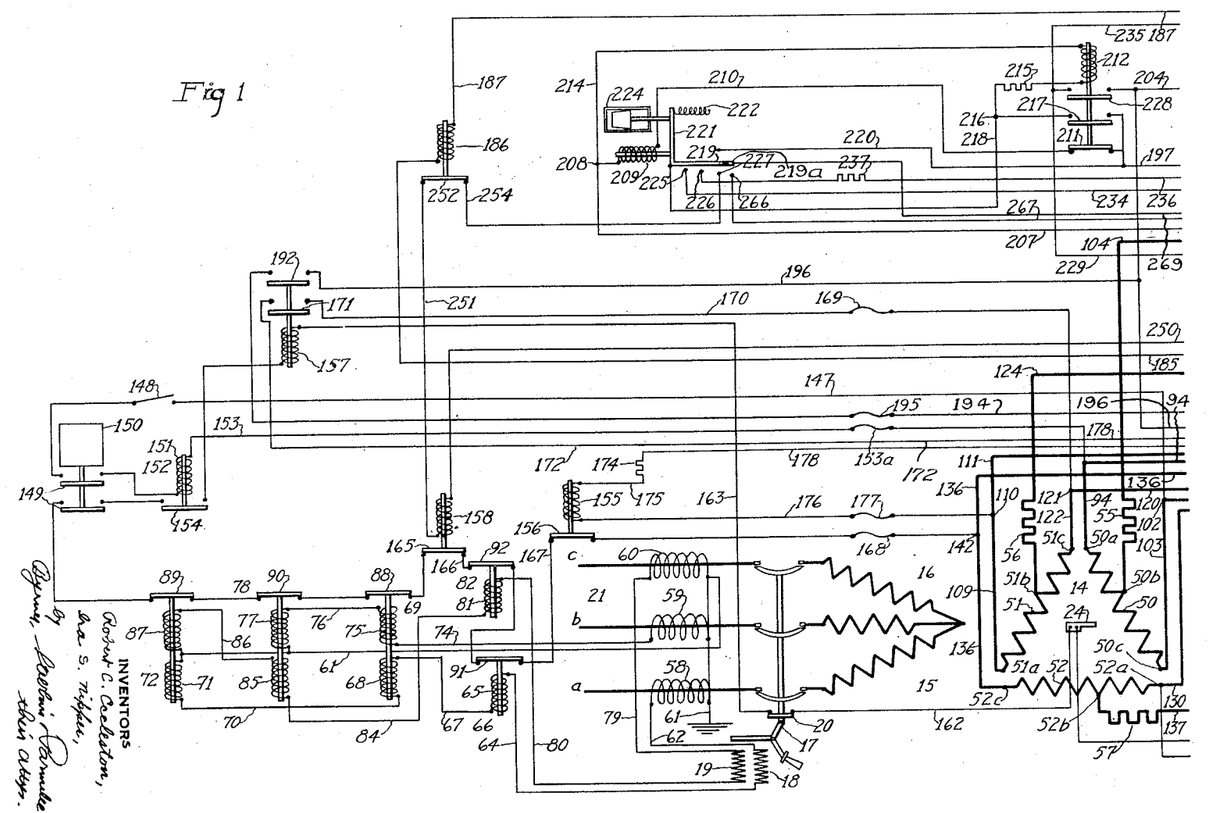
Figs. 1 and 2 are diagrammatic views of circuits and apparatus embodying our invention.
Figure 2:
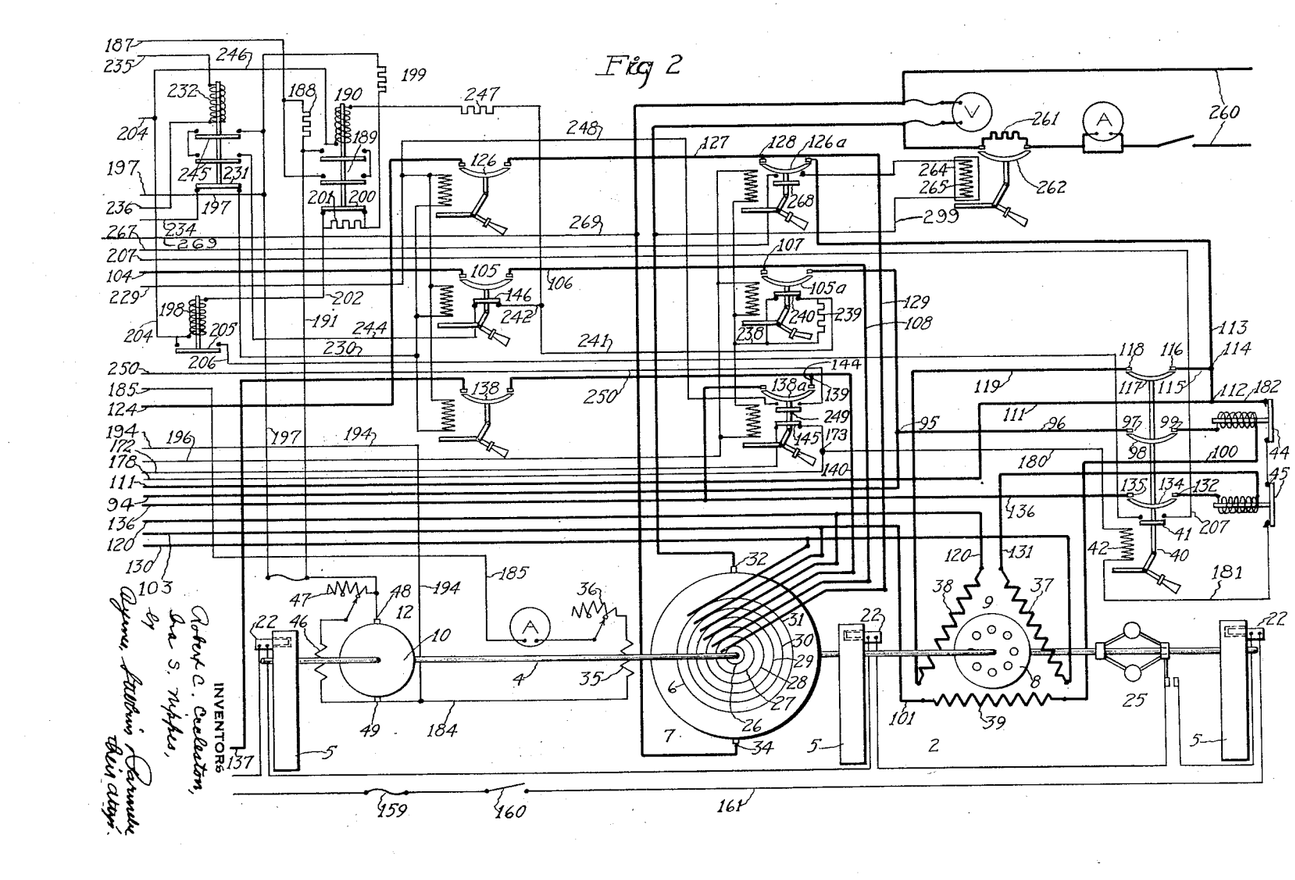

Referring to Figs. 1 and 2, the foregoing circuit extends from the terminal 52a, through a fuse 159, a manually-operated switch 160, a conductor 161, the several bearing thermostats 22, the transformer thermostat 24 and the overspeed switch 25 in series, a conductor 162, the front contact 20, the conductor 163, the winding of relay 157, the contact 154 of relay 152, the clock contact 149, the phase-failure relay contacts 88, 89 and 90 in series, back contact 165 of relay 158, conductor 166, the contacts 91 and 92 of the overload relays 66 and 81 in series, the conductor 167, back contact 156 of relay 155 and fuse 168 to the terminal 142 through the conductor 136 to the terminal 52c. The completion of this circuit initiates the automatic operation of starting the rotary converter. The establishing of this circuit is contingent upon the manual operation of the switch 160 and the circuit interrupter 17.

Initiation of motor movement

The energization of relay 157 controls the closing of the circuit interrupter 40 for connecting the motor 9 to the transformer 15. This is accomplished by a circuit extending from transformer terminal 51c, through the conductor 122, a fuse 169, a conductor 170, front contact 171 of relay 157, a conductor 172 to the back contact 145 of the circuit interrupter 138a and a terminal 173. From the terminal 173 one circuit extends through conductor 178 to a resistor 174, a conductor 175, the winding of the thermal relay 155, a conductor 176, a fuse 177, the terminal 110, and a conductor 109 to the terminal 51a. From the terminal 173 a second circuit extends through a conductor 180, the holding coil 42 of the circuit interrupter 40, a conductor 181, the contact of overload relays 44 and 45 in series, a conductor 182, the terminal 112, conductor 111, terminal 110 and the conductor 109 to the terminal 51a. Accordingly, the thermal relay 155 is in parallel circuit with the closing coil 42 of the circuit interrupter 40, connecting the motor 9 to the transformer 15.

Accordingly, should the coil 42 be energized an undesired length of time, the thermal relay 155 is actuated to open its contact 156, thereby deenergizing the initiating circuit including the winding 157. By reason of the inclusion of the back contact 145 of the circuit interrupter 138a, in circuit with the coil 42 of the circuit interrupter 40, the circuit interrupter 40 cannot be closed when the circuit interrupter 138a is closed. This interlock prevents the possibility of starting the motor 9 while full voltage is on the slip rings. The completion of this circuit connects the motor 9 to the transformer 15 with the full voltage impressed thereon and it begins to turn, thereby turning the shaft, the converter rotor 6 and the exciter rotor 10. At this time, the rotor 6 is spun without any voltage impressed upon either the direct current or alternating current windings. However, the exciter 12 begins to build up a potential between the brushes 48 and 49.

*Exciter circuit*

The field 35 of the rotary converter 7 is connected directly across the brushes of the exciter 12 through a circuit that extends from the brush 49 through a conductor 184, the exciting winding 35, the resistor 36, an ammeter, conductor 185, a winding of relay 186, a conductor 187, a resistor 188 in parallel circuit with the contacts 189 of a relay 190, and a conductor 191 to the brush 48. By reason of the resistance 188 in series with the exciting winding 35, the amount of current traversing the latter is limited, but as the current builds up simultaneously with the initiation of movement of the shaft 4 and the exciter rotor 10 and converter rotor 6 connected thereto, a weak current is impressed upon the rotary converter 7 before it has attained a considerable speed.

The current traversing this circuit insures that the polarity of the rotary converter 7 is fixed as it is brought up to speed, with the result that polarity switches are eliminated from our rotary converter. Also the presence of the weak field reduces the stresses, such as armature reactions and high voltage between adjacent commutator bars present in other rotary converters, when the exciting winding is energized during the accelerating period.

*Relay system for supplying reduced voltage to the slip rings*

Energization of the relay 157 closes contact 192, connects the brushes 49 through a conductor 194, a fuse 195 and itself to a bus bar 196 to which the relay circuits hereinafter described are connected. The brush 48 is directly connected to a bus bar 197.

When the exciter 12 attains its normal voltage, a relay 198 is energized by a circuit extending from the bus bar 197 through a resistance 199, the back contact 200 of the relay 190 in parallel circuit with a resistor 201, a conductor 202, the winding of the relay 198 and a conductor 204 to the bus bar 196.

Energization of the relay 198 causes it to close its contact 205 for completing a circuit extending from the bus bar 196, through the conductor 204 and the contact 205, conductor 206, the front contact 41 on the circuit interrupter 40, and conductor 207 to a terminal 208. From the terminal 208 one circuit extends through the winding of a relay 209, a conductor 210 and through the back contact 211 of a relay 212 to the bus bar 197. The other branch of the circuit extends through a conductor 214, through the winding of relay 212, a resistor 215 to a terminal 216, from which a circuit may be completed through the front contact 217 of the relay 212 to the bus bar 197, or through the conductor 218, a contact arm 219 of the relay 209, and a conductor 220 to the bus bar 197.

The relay 209 is of special construction. The contact arm 219 is one arm of a bell crank. The other arm 221 is attached to the core of the relay 209 and is biased in opposition to the pull of the winding 209 by a coil spring 222 that opposes a dash-pot 224. The contact arm 219, when in its upper position, engages the conductor 220; and as it descends under the action of the spring 222, it successively engages contacts 225, 226, 227 and an auxiliary contact controlling a reclosing circuit breaker. When the relay 209 is first energized, it pulls the contact arm 219 into engagement with the terminal of the conductor 220, thereby establishing a shunt circuit around the contact 217 of the relay 212, which immediately energizes the latter to complete its own holding circuit therethrough.

The energization of the relay 212 deenergizes the relay 209 through back contact 211 and permits the contact 219 to move downwardly under the influence of the spring 222 against the action of the dash-pot 224 to complete a series of circuits for connecting the rotary converter 7 to the terminals 50b, 51b and 52b of the transformer secondary winding 14. The relay 209 cannot be energized after the circuit interrupter 40 is opened, thereby providing an interlock for insuring that alternating current cannot be applied to the rotary converter 7 until the motor 9 is in operation.

As the contact arm 219 descends, it first engages the contact 225 which completes a circuit extending from the bus bar 196, through the contact 228, conductor 229, the closing and holding coils for the circuit interrupters 105, 138 and 126, in parallel circuit, a conductor 230, the back contact 231 of a relay 232, conductor 234, terminal 225, contact arm 219, conductor 218 and through the contact 217 to the bus bar 197. Upon the completion of this circuit, the circuit interrupters are closed which connects the mid-point taps of the windings 50, 51 and 52 with the slip rings 27, 26 and 28, respectively, whereupon the rotary converter becomes energized and acts as a motor in assisting the motor 9 to speed up the rotary converter set.

Further downward movement of the contact arm 219 causes engagement with the contact member 226, thereby completing a circuit extending from the contact 228 of relay 212, through a conductor 235, the winding of relay 232, a conductor 236, a resistor 237, contact 226, contact arm 219, conductor 218 and through the contact 217 to the bus bar 197. Upon the completion of this circuit, the contact 231, in series with the holding coils of the circuit interrupters 105, 126 and 138, is opened, thereby deenergizing them and permitting them to fall open. The setting of the relay 209 is such that the period of time during which the circuit interrupters are closed is sufficient for the rotary converter set to come up to sub-synchronous speed.

Upon further downward movement of the contact arm 219, it engages a contact member 227 for a purpose hereinafter described.

*Application of full voltage to the rotary converter*

After the opening of the circuit interrupters 105, 126 and 138, a circuit is completed that extends from the bus bar 196, through the closing coils of the circuit interrupters 105a, 126a and 138a, in parallel circuit, a conductor 238, a resistor 239 that is shunt circuited by back contact 240 on the circuit interrupter 105a, a conductor 241, a conductor 242, the interlock 146 on the circuit interrupter 105, a conductor 244 and the double contacts 245 on the relay 232 to the bus bar 197. The foregoing circuit is completed when the contact arm 219 engages the terminal 226 and when the circuit interrupter 105 is open. Accordingly, the circuit interrupters 105a, 126a and 138a cannot be closed while the circuit interrupters 105, 126 and 138 are closed. When the circuit interrupter 105a is open, the resistor 239 is shunt circuited, thereby permitting a large current to traverse the closing coils for the several breakers. However, when the breaker has closed, the resistor 239 is inserted in the circuit to limit the holding current supplied to the interrupters.

Closing of the interlock 146 completes a circuit from the conductor 196 through a conductor 246, coil of the relay 190, a resistor 247, conductor 242, interlock 146, conductor 244 and contacts 245 to the bus bar 197. Upon the energization of the relay 190 it closes its contacts 189 to shunt circuit the resistor 188 in circuit with the exciting winding 35 of the rotary converter 7. This permits the full exciting current to be imposed upon the rotary converter 7. By the time the contacts 189 are operated to shunt circuit the resistor 188, the rotary converter has been brought up to synchronous speed by the combined operation of the motor 9 and converter 7, while the latter acts as a motor.

A circuit is also completed that extends from the bus bar 196, through the contact 228, conductor 229, conductor 248, the front contact 249 on the circuit interrupter 138a, a conductor 250, winding of relay 158, a conductor 251, the back contact 252 of relay 186, conductor 254, terminal 227, contact arm 219, conductor 218 and contact 217 to the bus bar 197. The increase in current traversing the circuit comprising the exciting winding of the rotary converter 7, after the resistance 188 is shunt circuited, energizes the relay 186 to cause it to open back contact 252 in the circuit of the relay 158, thereby preventing the latter from being energized and opening its contacts 165. Should the converter excitation fail for any reason, the relay 186 closes its contact 252 completing the circuit energizing relay 158 which opens contact 165 in the initiating circuit. Contact 165 remains open and prevents the completion of the initiating circuit until excitation is restored.

*Automatic reclosing circuit breaker*

The outgoing direct-current feeder circuit 260 is provided with any suitable type of automatic reclosing circuit breaker mechanism shown diagrammatically by a resistor 261, bridging a circuit interrupter 262, and a device represented diagrammatically by the square 264 containing a closing coil 265. The energization of the closing coil 265 is controlled by a circuit that extends from the main bus bar from the converter through conductor 269 to an insulated contact 219a on contact arm 219, to auxiliary contact 266, conductor 267, front contact 268 on circuit interrupter 126a, the coil 265 and the conductor 299 to the other main bus bar from the converter.

Operation

Figure 3:
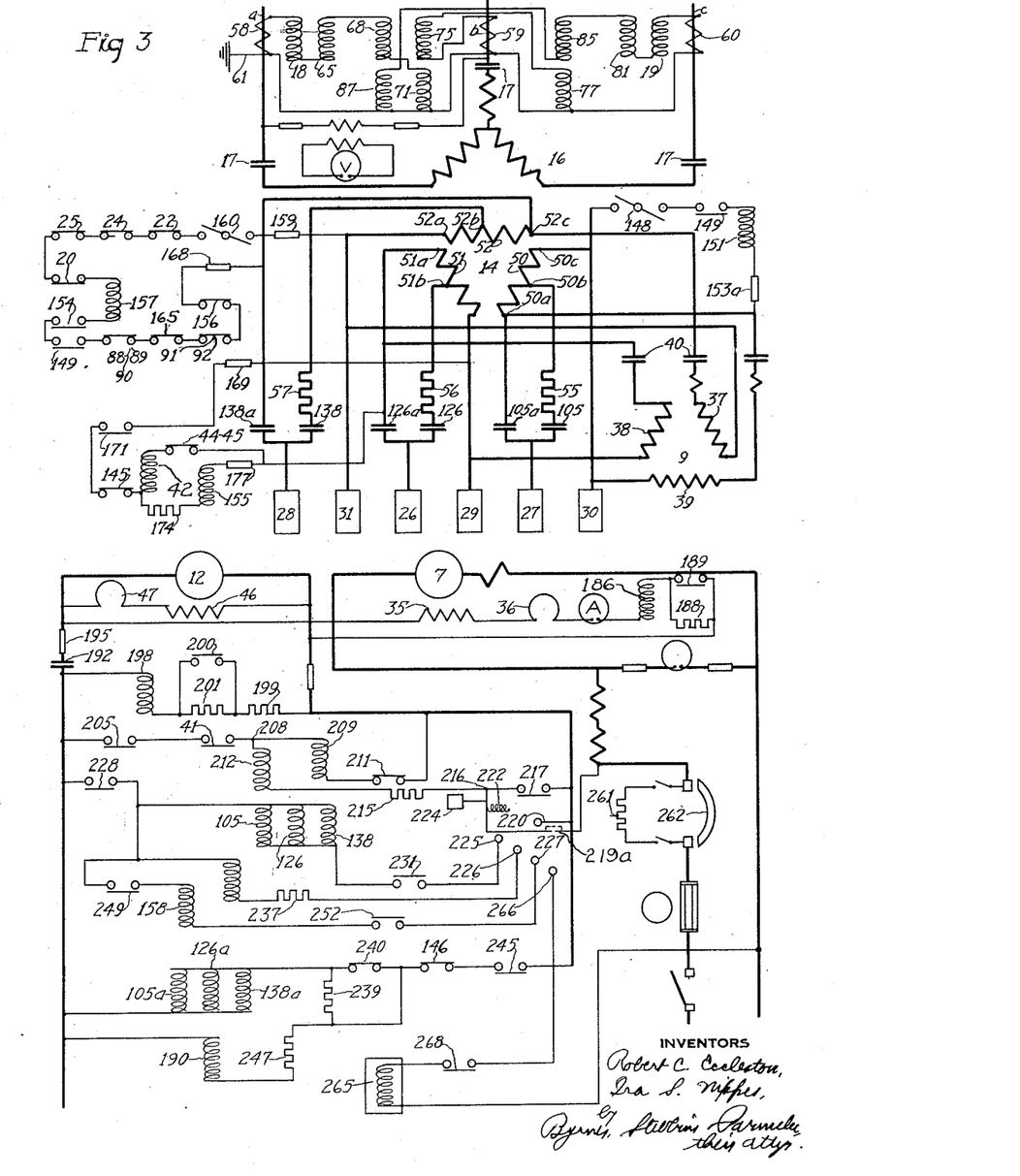
Fig. 3 is a straight-line diagram of the circuits shown in Figs. 1 and 2.

Referring to Fig. 3, when it is desired to start the rotary converter 7, the circuit interrupter 17 is manually closed, together with the snap switches 148 and 160. Closing of the circuit interrupter 17 energizes the transformer 15, and the initiating circuit for the relay 157. The energization of relay 157 controls the closing of a circuit actuating the circuit interrupter 40 for connecting the motor 9 to the secondary winding 14 of the transformer. As soon as the motor 9 has voltage impressed thereon, it starts to turn the shaft 4 and the rotors of the rotary converter 7 and exciter 12.

As soon as the rotor 10 is turned, a voltage is built up that permits a small current to traverse the exciting winding 35 of the rotary converter 7. By reason of this excitation of the exciting winding, the polarity of the rotary converter is established at an early stage of its operation, thereby eliminating the necessity for brush-lifting devices and polarity switches. As the speed of the shaft 4 increases, as indicated by an increase in voltage of the exciter 12, a relay 198 is actuated that controls the time-limit relay 209. Upon the excitation of the time-limit relay 209, it energizes the relay 212 that immediately interrupts the circuit of the relay 209, thereby permitting the contact arm 219 to move downwardly under the influence of spring 222 against the retarding action of the dash-pot 224. The downward movement of the arm 219 first energizes the closing coils for the circuit interrupters 105, 126 and 138, thereby applying half voltage to the slip rings 26 to 31, inclusive.

After the lapse of a predetermined period, the arm 219 engages a contact 226 to open a contact 231 in series with the coils of circuit interrupters 105, 126 and 138, thereby deenergizing them and permitting the circuit interrupters to fall open. As soon as the circuit interrupters open, as shown by the closing of an interlock 146 in the form of a back contact carried by the circuit interrupters 105, a circuit is completed for energizing the coils of the circuit interrupters 105a, 126a and 138a, thereby placing the full potential upon the alternating current windings of the rotary converter 7. During this period, the rotary converter 7 is brought up to speed, first solely by the action of the motor 9, and then by the combined action of the motor 9 and the converter 7 acting as a motor with subnormal voltage applied thereto.

When the exciter 12 is up to speed and the interlock 146 is closed, a relay 190 is energized for shunt circuiting the resistor 188 in the circuit of the exciting winding 35, whereby normal exciting current may traverse the latter winding. At the same time, the relay 190 opens the contact 200, thereby inserting sufficient resistance in the circuit of the winding of the relay 198 to prevent its operation to again actuate the time relay 209 until the exciter voltage has dropped below a predetermined amount. An interlock is provided for inserting resistance in the circuit of the coils for the circuit interrupters 105a, 126a and 138a, to differentiate between closing current values and holding current values.

Closing of circuit interrupter 126a completes a circuit that energizes the closing coil of circuit interrupter 262. The closing of the interrupter 138a opens the circuit for the closing coil 42 at the contact 145, thereby opening the interrupter 40 and disconnecting the motor 9 from the transformer 15.

The rotary converter is equipped with bearing thermostats, transformer thermostats, over-speed switches, fuses, and the like, that control the initiating circuits. The prevention of the operation of the automatic starting system, in case of phase failure during the starting operation is provided for by the provision of phase-failure relays whose contacts are in the initiating circuit. Likewise, overload relays are provided for opening the initiating circuit. In order to prevent the closing of the circuit interrupter 40 to the motor 9 in case of phase-failure on any one phase of the circuit, a circuit is provided across a different phase than is the initiating circuit. A contact 154 is controlled by the auxiliary phase protecting circuit. A clock, having contacts 149 in the initiating circuit, controls the time at which the rotary converter may be started. In automatic substations in mines, it is frequently desirable to permit the rotary converter to operate only at given times of the day.

The direct current distributing circuit 260 is provided with an automatic, resistance-measuring circuit interrupter 262 that is controlled by an interlock through the circuit interrupter 126a and the time relay 209. A manually reset thermal relay is provided for disconnecting the induction motor should it be energized for too long a period.

Accordingly, we have provided a system and apparatus for automatically starting a rotary converter from rest without the use of brush-lifting devices or polarity switches. We accomplish this result by establishing the polarity of the field of the rotary converter as soon as it is spun by an induction motor. As the speed of the rotor increases, the voltage of an exciter, directly connected thereto, increases for controlling a relay system that first applies half voltage to the alternating current windings of the converter, then applies full voltage, during which time the rotary converter comes up to speed by the combined action of an induction motor and its own action when running as an induction motor. Full field excitation is not applied until the full alternating current voltage is applied to the rotary converter. A system of interlocks is provided for insuring that both intermediate voltage and full voltage cannot be impressed upon the alternating current windings of the rotary converter at any time.

The relay system comprises interlocking relays for insuring that the proper voltage shall be generated by the exciter before the successive steps are carried out and in the case of shutting down the rotary converter, that it cannot be again started until the exciter voltage has dropped below a predetermined value.

While we have shown and described a present preferred embodiment of our invention, it is to be understood that various changes may be made in the invention without departing from the scope of the appended claims.

We claim:

1. In a rotary converter system, a rotary converter having a plurality of slip rings, a transformer comprising a plurality of subdivided winding sections, means for selectively connecting the end terminals of each section with a pair of slip rings, and means for connecting an intermediate terminal of each of said sections with one of the pair of slip rings cooperating with the section, said means comprising impedance devices in circuit with the slip rings and transformer terminals.

2. In a rotary converter system, a rotary converter, a starting motor therefor, slip rings on the rotary converter, a transformer comprising a plurality of winding sections for energizing pairs of slip rings and said motor while in parallel circuit, a conductor comprising an impedance device disposed between an intermediate point on each of the transformer winding sections and one of the slip rings cooperating with the transformer section, and a relay system for controlling the connections of the motor to the transformer and for controlling the connections of said pairs of slip rings to the transformer winding sections for selectively applying full voltage to said pairs of slip rings or for applying a reduced and substantially constant voltage through said intermediate conductors and impedance devices.

3. In a rotary converter control system, the combination with a source of energy, a prime mover connected thereto for driving the converter during the starting period, and an exciter, of a relay system responsive to the voltage generated by the exciter, having means for initially supplying current to the rotary converter after the lapse of a predetermined time following an increase in exciter voltage to a predetermined value.

4. In a control system for a rotary converter, a prime mover for driving the converter during the starting period and a directly-coupled exciter, a relay system including means responsive to the voltage generated by the exciter for initially energizing the converter and a time element relay having a contact arm and a plurality of stationary contact members for subsequently controlling the voltage applied to the rotary converter during the starting operation.

5. In a control system for a rotary converter, means for driving the converter during the starting period, means responsive to the speed of the converter for initially applying voltage thereto, and means for increasing the applied voltage at a predetermined period in the acceleration of the converter.

6. In a rotary converter control system, the combination with a prime mover for driving the converter during the starting period and a directly-coupled exciter permanently connected to the converter field, of a relay system including means responsive to the exciter voltage for controlling the initial application of voltage to the converter, and a time element relay for subsequently controlling the voltage applied to the converter.

7. In a rotary converter system, the combination with a rotary converter, a prime mover therefor, and a directly-coupled exciter, of a relay system comprising means for limiting the current in the converter field winding during the initial period of rotor acceleration, means for increasing the exciting current at a predetermined point in the accelerating operation, and means for controlling the supply of alternating current to the converter in accordance with the voltage of the exciter.

8. A method of starting a rotary converter which includes the steps of driving the rotor of the converter, supplying a limited current to the converter field winding, initially applying low voltage to the armature winding when the converter has reached a predetermined speed, and subsequently applying normal voltage to the armature winding and increasing the field current.

9. In a rotary converter control system, the combination with a prime mover for the converter and a directly-coupled exciter permanently connected to the converter field winding for fixing the polarity of the rotary converter simultaneously with the initiation of movement of its rotor by the prime mover, of means responsive to a definite value of exciter voltage for applying substantially constant reduced voltage to the rotary converter during its period of acceleration for assisting the prime mover in bringing the rotary converter into synchronism.

10. An automatic control system for a rotary converter comprising a mechanically coupled exciter permanently connected to the converter field winding, a current limiting resistor in circuit with said winding, a motor for driving the converter and a relay system responsive to the voltage of said exciter for initially supplying current to the converter armature and for subsequently shunting said resistor.

11. A starting system for a dynamo-electric machine having a direct-coupled exciter connected to the field winding of said machine, including a motor for starting the machine, means actuated by the voltage of said exciter for applying low voltage to the armature of the machine, and means for transferring the armature to normal voltage after a predetermined time.

12. In a method of starting a dynamo-electric machine having a direct-coupled exciter connected to the field winding thereof, which includes the steps of driving the machine, applying low voltage to the machine armature when the exciter voltage reaches a predetermined value and transferring the armature to full voltage after a predetermined time.

13. In an electrical translating system, a dynamo-electric machine, means for starting the machine with its windings de-energized, means responsive to the speed of the machine for supplying initial driving current thereto, and means for supplying driving current at higher voltage and for delivering load current after predetermined times.

14. In combination, an alternating current circuit, a direct current circuit, a rotary converter for transferring power from one to the other of said circuits and having a field winding, a starting motor for said converter, a generator coupled to said converter to supply current to said field winding, electromagnetic means for connecting said motor to one of said circuits, electromagnetic means, including means responsive to the generator voltage and subject to a time delay, for establishing low voltage starting and high voltage running connections between said converter and the alternating current circuit, means for disconnecting the starting motor from its supply and for connecting the converter to the direct current circuit, and means to disconnect the converter from both circuits if the field current fails to attain a given value.

In testimony whereof we have hereunto set our hands.

ROBERT C. ECCLESTON.
IRA S. NIPPES.